Aug. 6, 1968   F. P. G. FRANCIS ET AL   3,395,772
FLEXIBLE SKIRTS FOR AIR CUSHION BORNE VEHICLES
Filed Sept. 14, 1965   2 Sheets-Sheet 2

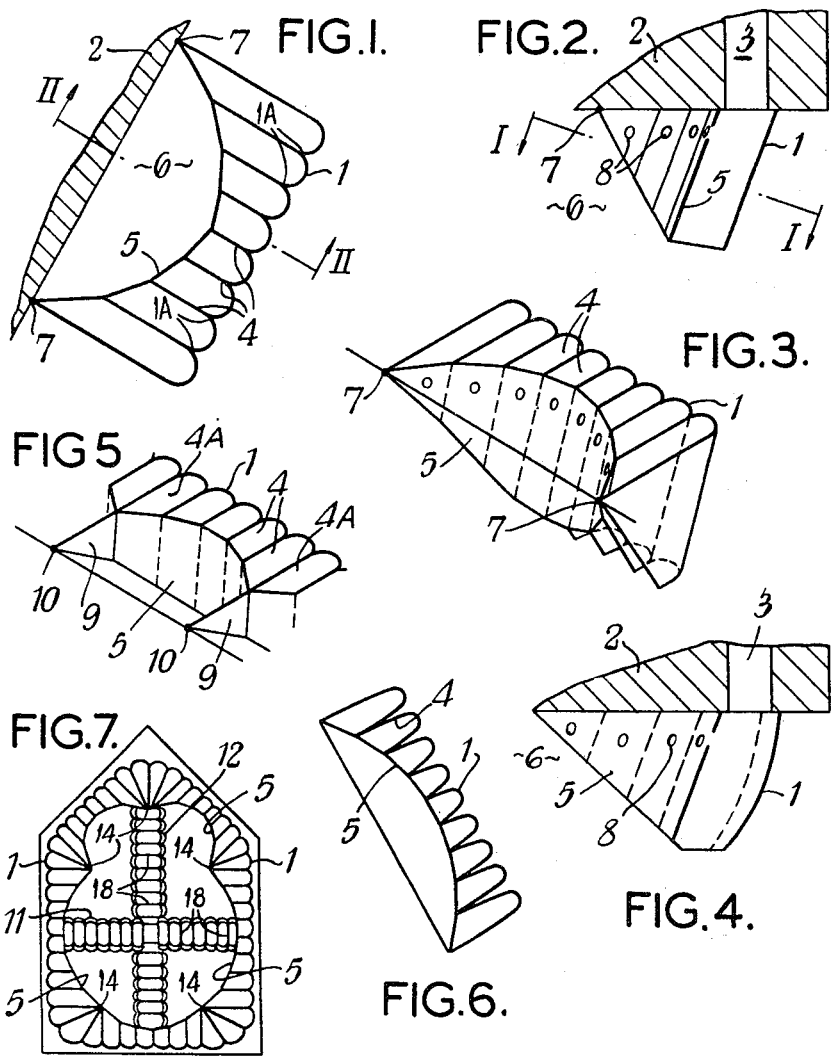

INVENTORS.
FRANK PHILLIP GEORGE FRANCIS
GORDON VICTOR WATTS
BY
Pennie, Edmonds, Morton, Taylor & Adams

ATTORNEYS

United States Patent Office 3,395,772
Patented Aug. 6, 1968

3,395,772
FLEXIBLE SKIRTS FOR AIR CUSHION
BORNE VEHICLES
Frank Phillip George Francis and Gordon Victor Watts, Wiltshire, England, assignors, by mesne assignments, to British Hovercraft Corporation Limited, Yeovil, England
Filed Sept. 14, 1965, Ser. No. 487,268
Claims priority, application Great Britain, Sept. 17, 1964, 38,090/64
12 Claims. (Cl. 180—127)

ABSTRACT OF THE DISCLOSURE

The invention concerns flexible skirts for air cushion borne or ground effect vehicles including several skirt units all of which have substantially vertically corrugated outer skin with the peaks projecting inwards into the air cushion space and the flexible sheet material between the peaks bulging outwardly under the influence of the air cushion pressure. The outer skin is prevented from splaying outwardly by webs each lying in a substantially vertical plane perpendicular to the general direction of the skirt and attached at one edge to the peaks of the corrugations. The opposite edges of these webs, which are parallel, are attached to a tension member, which lies within the air cushion space and extends generally in the direction along the skirt unit. This tension member is concave inwardly with respect to the vehicle body, i.e., its ends, which are attached to the vehicle body, are farther from the outer skin than its middle portion. The tension member is similar in principle to that of the cables of a suspension bridge and the webs act in a similar manner to the vertical ties of the bridge which extend at intervals down from the cable to support the roadway.

---

This invention relates to flexible skirts for air cushion borne vehicles.

According to the present invention there is provided a flexible skirt unit for a skirt for minimising lateral escape of air from the air cushion of an air cushion borne vehicle, the skirt unit comprising an outer corrugated skin of flexible material, the ridges of the corrugated skin extending inwardly and the peaks of the ridges extending in an up and down direction, and a flexible tension member to which said peaks are attached, the tension member serving at its ends for connection to the vehicle body, being concave inwardly and serving to retain the outer skin against outward movement.

It is to be understood that throughout the Specification the terms "inward" and "outward" refer to the air cushion space which the skirt laterally enclosed.

Figure 8:
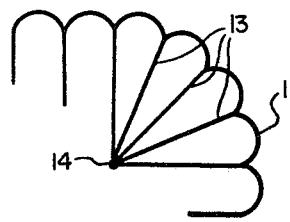
Figure 9:
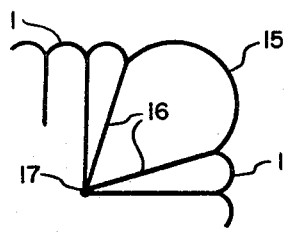
Figure 10:
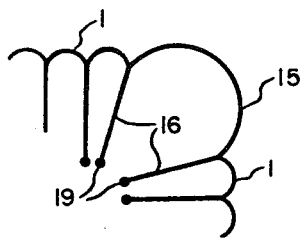
Figure 11:
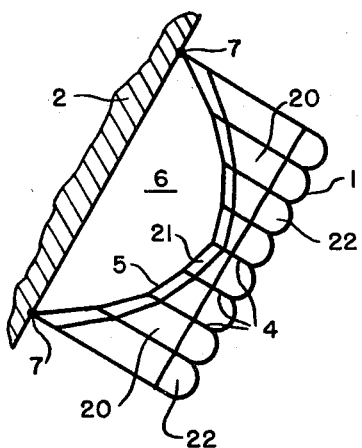
Figure 12:
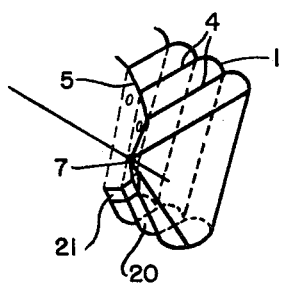

For a better understanding of the invention show how the same may be carried into effect, reference will now be made, by way of example, to the accompanying drawing, in which:

FIGURE 1 is a section of a skirt unit of an air cushion borne vehicle, the section being taken on the inclined line I—I of FIGURE 2, FIGURE 2 is a section on the line II—II of FIGURE 1, FIGURE 3 is a perspective view of the skirt unit of FIGURE 1, FIGURE 4 is a section, similar to the sectional view of FIGURE 2, of a modified form of skirt unit, FIGURE 5 is a perspective view of part of a further modified form of skirt, FIGURE 6 is a section similar to the sectional view of FIGURE 1, of another modified form of skirt unit, FIGURE 7 is an underneath plan view of an air cushion borne vehicle having skirt units as shown in FIGURE 1, FIGURE 8 is a diagrammatic plan view of part of a skirt at the corner of an air cushion borne vehicle, FIGURE 9 is a diagrammatic plan view of a modified corner of a skirt of an air cushion borne vehicle, FIGURE 10 is a diagrammatic plan view of a further modified corner of a skirt, FIGURE 11 is a view similar to FIGURE 1 of another modified skirt unit, and FIGURE 12 is a perspective view, similar to part of FIGURE 3, of part of the skirt unit of FIGURE 11.

The skirt unit of FIGURES 1 to 3 has an outer flexible skin or wall 1 which is of corrugated form and has inwardly extending ridges whose peaks 1A lie in vertical planes. The skin 1 is attached at its upper edge to the underside of the periphery of a vehicle body 2 and slopes downwardly and inwardly. A peripheral duct 3 is provided in the vehicle body 2 for directing air onto the inside surface of the skin 1. The skin 1 is prevented from spreading outwards by upright webs 4 of flexible material whose outer edges are attached to the peaks of the inwardly extending ridges of the skin 1 and whose inner edges are attached to a flexible tension membrane 5 which is suspended by its upper edge from the underside of the vehicle body 2. The upper edges of the webs 4 may or may not be attached to the underside of the vehicle body 2. The membrane 5 tapers at each end and has a maximum depth, equal to that of the skin 1, at its middle. In a modification such as that shown in FIGURE 4 this maximum depth is less than that of the skin 1. The membrane 5 slopes downwardly and inwardly from the underside of the vehicle body 2 so that the planes of the webs 4 intersect it in lines which are parallel to the associated peaks of the ridges of the skin 1 and the membrane 5 is concave inwardly with respect to the air cushion space 6 which is enclosed by the skin 1. Although the upper edges of the membrane 5 is attached to the underside of the vehicle body 2, two principal anchor points 7 for securing the membrane 5 to the body 2 are provided, one at each of the member 5.

When air is supplied to the cushion space 6 through the duct 3 the pressure acting on the inside of the skin 1 causes the corrugations of the skin to adopt a semicylindrical shape and to create a tension in the webs 4 which pull outwardly on the tension membrane 5. The webs 4 and the membrane 5 are so dimensioned and the locations at which the webs 4 are attached to the membrane are so spaced that the skin 1 is maintained in position along the underside of the vehicle body 22, the member 5 acting in the manner of the cable of a suspension bridge. When under tension, the membrane 5 has a plurality of substantially planar portions each one of which has an aperture 8 for preventing a pressure differential building up across that membrane. The air from the duct 3 flowing downwardly through the skirt leaves the lower edges of the skin 1 in the form of an air curtain encircling and sustaining the air cushion 6.

The section of FIGURE 2 shows that both the skin 1 and the membrane 5 are straight in vertical cross-section. In the modification of FIGURE 4 the skin 1 is arcuate in vertical cross-section, the arc being centered on the line joining the anchor points 7. In a further modification (not shown) the tension member is also arcuate and centered on the line joining the anchor points 7. The combination of arcuate and straight skins and tension members 5 and the downward and inward slant thereof may be made as desired to form converging, diverging or parallel sided extensions to the duct 3. It will be understood that similar skirts could be employed in plenum chamber air cushion borne vehicles, in which case there would be no need to have the duct 3 at the periphery of the body 2 for supplying air for an air curtain.

The skirt unit of FIGURE 1 can be independently attached to the underside of the vehicle body 2 and with the other units of a similar kind a complete skirt can be built up. In the skirt of which part is shown in FIGURE 5 a skin 1 is again attached to a tapering, curved tension membrane 5 by means of webs 4, but the ends of adjacent tension membranes 5 do not taper to a point, being joined end to end where the membranes 5 still have some depth. A web 4A extends inwardly from one of the peaks of the ridges of the skin 1 to be attached to the junction of adjacent tension membranes 5. A web 9 of triangular form tapers inwardly from this junction and is anchored to the underside of the vehicle body at a point 10. This construction gives an extension to the duct 3 between the skin 1 and the membranes 5 which does not vary to such a great extent in width as the extension formed by the skirt unit of FIGURES 1 to 3. The ends of this skirt are formed as the ends of the skirt unit of FIGURE 1. The skirt unit of FIGURE 6 is similar to that of FIGURE 1 except that the skin 1 is divided into separate corrugations, each inwardly extending edge of which is attached by a web 4 to the tension membrane 5. Webs from adjacent edges of adjacent corrugations are attached along a common line to the member 5.

The skirt units of FIGURES 1 to 3 and the skirt of FIGURE 5 are for extending along the straight side of a vehicle body and in the case of the embodiment of FIGURE 1 each unit is attached separately but with adjacent units both being anchored to the same point 7. The units are individually removable for ease of maintenance. In a modification (not shown) the end webs 4 of each skirt unit are made common to adjacent skirt units so that the skin 1 is continuous along one side of the vehicle, such as is the case with the skirt of FIGURE 5. FIGURE 7 shows, in underneath plan view an arrangement of the skirt units of FIGURE 1 fitted to an air cushion borne vehicle, this vehicle having transverse and longitudinal stability skirts 11 and 12 fitted within the air cushion space. Each skirt 11 and 12 has two corrugated walls with the peaks of the corrugations extending in an up and down direction and opposite peaks of the two walls of each skirt being joined by webs 18 which divide the skirts 11 and 12 into downwardly funneling cells. The ends of the skirts 11 and 12 are not attached to the adjacent tension membranes but are as close as possible to those membranes to impede passage of air between the compartments into which the air cushion space is divided by the skirts 11 and 12. In operation the tension members 5 do not move appreciably inboard or outboard and the ends of the skirts 11 and 12 therefore do not interfere with the outer skin of the peripheral skirt.

The tension membranes have been described as being fixed along their upper edges to the underside of the vehicle body 2. They may, however, be left unattached except for, in the case of the skirt unit of FIGURE 1 the anchor points 7. The corrugations of the skin 1 need not assume a semi-cylindrical shape upon build-up of the air cushion; they may be of flatter form. In this case lateral support is required but this can be provided by such corner arrangements as described below.

At corner junctions between such skirt units as described above, the arrangements of FIGURES 8 or 9 may be employed. In the corner arrangements of FIGURE 8, the outer skin 1 is continuous around the corner and its corrugations have the same radius of curvature, in plan view, at the corner as those along the straight sides of the vehicle. Webs 13 of equal length along the top edges extend inwardly from the peaks of the corner corrugation and join at a common point 14 where they are attached to the vehicle body. Since the membrane tensions in the corrugations, due to the air cushion pressure acting on the skin 1, are equal, the membrane tension being proportional, for constant air pressure, to the radius of curvature, the skirt is stable at the corner.

In the modified corner shown in FIGURE 9, a large convolution 15 is disposed at the corner and is held by webs 16 to an anchor point 17 on the vehicle body. The tensions in the corrugations of the skin 1 extending along the straight sides of the vehicle are different from the tension in the convolution 15, but the angles of the webs 16 with respect to the adjacent webs 4 is chosen so that the corner will be stable.

In a modification of the corner of FIGURE 9, the webs 16 do not meet at a common anchorage point, but are independently attached to the vehicle body at points 19, as shown in FIGURE 10. The lengths of the webs 16 need not be equal in such a modification.

To all the embodiments described above, there may be added an inner skin to the skirt, this skin being attached to the under sloping edges of the webs 4, 9, 13 or 16. This inner skin may be corrugated as the outer skin 1 is, to allow longitudinal movement of the skirt. Preferably, this inner skin does not extend to the under edge of the membrane 5 so that air can pass across the top of the inner skin to prevent a pressure differential building up. The skirt unit of FIGURES 1 and 3 modified in this way is shown in FIGURES 11 and 12 where the corrugated inner skin 20 is attached to the sloping under edges of the webs 4 and has gaps 21 between its inner edge and the membrane 5 and gaps 22 between its outer edge and the skin 1. This inner skin 20 can serve to prevent, in use of the vehicle over water, scooping of water by the outer skin, particularly at the stern of the air cushion vehicle.

All the webs, and especially the webs 9 as illustrated in FIGURE 5, are preferably made from net or similar open mesh material to reduce weight and to permit passage of air, water or spray through the webs, thereby reducing drag and the possibility of damage due to water impact.

We claim:
1. A flexible skirt unit for a skirt of a vehicle supported on a cushion of air for minimising lateral escape of air from said air cushion, the skirt unit comprising an outer skin of flexible material including a plurality of adjacent corrugations with each corrugation disposed in a vertical plane and with the ridges of each of the corrugations extending inwardly toward said air cushion and with the peaks of the ridges extending in an up and down direction, a relatively smooth concave flexible membrane tension member extending along and inwardly of the outer skin, said concave tension member being inwardly concave when viewed in plan, and means securing said peaks to said membrane for retaining the outer skin against outward movement relative to said cushion, said membrane having means for attachment to the vehicle body.

2. A skirt unit according to claim 1, wherein the membrane tapers at each end and has a maximum depth at its middle equal to that of the outer skin.

3. A skirt unit according to claim 1, wherein the membrane is apertured opposite each corrugation of the outer skin.

4. A skirt unit according to claim 1, wherein said last-named means attach said peaks directly to said membrane.

5. A skirt unit according to claim 1, wherein said last-named means comprise flexible webs, said peaks being connected by said webs to said membrane.

6. A skirt unit according to claim 5, wherein adjacent peaks meet in a common ridge, said common ridge being connected to said membrane by one of said webs common to said last-mentioned ridge.

7. A skirt unit for a skirt of a vehicle supported on a cushion of air for minimising lateral escape of air from the air cushion, the skirt unit comprising an outer skin of flexible material including a plurality of corrugations with the ridges of each of the corrugations extending inwardly and the peaks of the ridges extending in an up and down direction, an inwardly concave flexible membrane tension member extending along and inwardly of the outer skin, webs connecting the peaks of the ridges to said membrane for retaining the outer skin against outward movement relative to said air cushion, an inner skin attached to the under edges of the webs, and means for attaching the membrane tension member to the vehicle body.

8. A skirt unit according to claim 7, wherein the inner skin is corrugated.

9. A skirt unit according to claim 7, wherein the inner edge of the inner skin is spaced from the bottom edge of said membrane.

10. A skirt for minimising lateral escape of air from the air cushion of an air cushion borne vehicle, the skirt comprising an outer skin of flexible material including a plurality of corrugations with the ridges of each of the corrugations extending inwardly and the peaks of the ridges extending in an up and down direction, inwardly concave flexible membrane tension members disposed end-to-end along and inwardly of the outer skin, means connecting the peaks of the ridges to the tension members for retaining the outer skin against outward movement relative to the air cushion, and means for attaching the ends of the tension members to the vehicle body.

11. A skirt according to claim 10 wherein the attachment means at the ends of the membranes are webs extending inwardly from the junctions of adjacent membranes.

12. A skirt according to claim 11, wherein said webs taper inwardly to a point for fixing to the vehicle body.

References Cited

UNITED STATES PATENTS 3,291,239   12/1966   Eggington et al. _____ 180—7
3,291,240   12/1966   Driver _____ 180—7

A. HARRY LEVY, *Primary Examiner.*